US008971185B1

(12) United States Patent
Pankajakshan (10) Patent No.: US 8,971,185 B1
(45) Date of Patent: *Mar. 3, 2015

(54) TIERED SUBSCRIBER SERVICE WITH ADVANCED HEADER COMPRESSION METHODS IN A VOIP SYSTEM

(75) Inventor: Bejoy Pankajakshan, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 70 days.

This patent is subject to a terminal disclaimer.

(21) Appl. No.: 13/549,574

(22) Filed: Jul. 16, 2012

Related U.S. Application Data

(63) Continuation of application No. 12/126,090, filed on May 23, 2008.

(51) Int. Cl.
*H04J 1/16* (2006.01)
*H04L 12/66* (2006.01)
*H04L 12/28* (2006.01)
*G06F 15/173* (2006.01)

(52) U.S. Cl.
USPC ........... 370/231; 370/356; 370/392; 370/401; 709/225

(58) Field of Classification Search
None
See application file for complete search history.

(56) References Cited

U.S. PATENT DOCUMENTS

| | | | |
|---|---|---|---|
| 7,409,447 B1* | 8/2008 | Assadzadeh | 709/225 |
| 8,264,958 B1* | 9/2012 | Pankajakshan | 370/230.1 |
| 2006/0104278 A1* | 5/2006 | Chang et al. | 370/392 |
| 2007/0180119 A1* | 8/2007 | Khivesara et al. | 709/226 |
| 2007/0206515 A1* | 9/2007 | Andreasen et al. | 370/255 |
| 2007/0291734 A1* | 12/2007 | Bhatia et al. | 370/352 |
| 2007/0297428 A1* | 12/2007 | Bose et al. | 370/401 |
| 2008/0144615 A1* | 6/2008 | Casey | 370/389 |

* cited by examiner

*Primary Examiner* — Melanie Jagannathan (57) ABSTRACT

One or more computer readable media, methods and systems that allow phone calls involving a mobile telephone to be to be conducted using VOIP technology with header compression of the voice packets and dynamically adjustable tiered subscriber service. A dynamic, tiered-subscriber service allows the bandwidth allotted to users subscribing to different levels of service to be adjusted between sessions to accommodate changing network conditions. Header compression involves compressing the voice packet header into a reduced number of bites. Embodiments of the present invention enable simultaneous header compression and dynamic tiered-subscriber service through a new call flow set up that includes a new policy. The new policy is given preference over the other installed policies and includes new attribute value pairs that enables both header compression and dynamic bandwidth adjustments.

18 Claims, 8 Drawing Sheets

STATIC FLOWS TO BE INSTALLED (PSTATIC)

310
312 — TITLE: (FL & RL) FOR VOIP MEDIA

314 — PRECEDENCE :1
316 — TYPE: DYNAMIC
318 — ROHC: MARK FLOWS FOR COMPRESSION
320 — DSCP POLICY: COPY FROM USER DATAGRAM
322 — FLOW ID: NONE
324 — FILTER RULES : PROTOCOL 6 FROM ANY ANY TO ANY ANY ; PROTOCOL 17 FROM ANY ANY TO ANY ANY 330
332 — TITLE: (FL & RL) FOR VOIP SIGNALING

334 — PRECEDENCE :2
336 — TYPE: DYNAMIC
338 — ROHC: MARK FLOWS FOR COMPRESSION
340 — DSCP POLICY: COPY FROM USER DATAGRAM
342 — FLOW ID: NONE
344 — FILTER RULES : PROTOCOL 6 FROM ANY ANY TO ANY ANY ; PROTOCOL 17 FROM ANY ANY TO ANY ANY

DYNAMIC FLOWS TO BE INSTALLED ON CCR/CCA EXCHANGE BASED ON SIGNALING TFT (PSIG-TFT)

410
412 — TITLE: FL POLICY FOR VOIP SIGNALING

414 — PRECEDENCE :3
416 — TYPE: TY
418 — ROHC: UNDEFINED
420 — DSCP POLICY: AF31
422 — FLOW ID: 0
424 — TRAFFIC POLICING: <ASSIGN MINIMAL BANDWIDTH BASED ON CUSTOMER NETWORK>
426 — FILTER RULES : PROTOCOL 17 FROM ANY <IMS SIGNALING PORT RANGE>TO ANY ANY 430
432 — TITLE: RL POLICY FOR VOIP SIGNALING

434 — PRECEDENCE :3
436 — TYPE: TY
438 — ROHC: UNDEFINED
440 — DSCP POLICY: AF31
442 — FLOW ID: 0
444 — TRAFFIC POLICING: <ASSIGN MINIMAL BANDWIDTH BASED ON CUSTOMER NETWORK>
446 — FILTER RULES : PROTOCOL 17 FROM ANY ANY TO ANY <IMS SIGNALING PORT RANGE>

DYNAMIC FLOWS TO BE INSTALLED ON CCR/CCA EXCHANGE BASED ON BEARER TFT (PBR-TFT)

510 —
512 — TITLE: FL POLICY FOR ROHC TRAFFIC

514 — PRECEDENCE :4
516 — TYPE: TY
518 — ROHC: MARK FLOWS FOR COMPRESSION USING NEW AVP
520 — DSCP POLICY: EF
522 — FLOW ID: 1
524 — TRAFFIC POLICING: <ASSIGN MINIMAL BANDWIDTH BASED ON CUSTOMER NETWORK>
526 — FILTER RULES :   PROTOCOL 17 FROM ANY  <ROHC PORT RANGE> TO ANY ANY

530 —
531 — TITLE: RL POLICY FOR ROHC TRAFFIC

532 — PRECEDENCE :4
534 — TYPE: TY
536 — ROHC: MARK FLOWS FOR COMPRESSION USING NEW AVP
538 — DSCP POLICY: EF
540 — FLOW ID: 1
542 — TRAFFIC POLICING: <ASSIGN MINIMAL BANDWIDTH BASED ON CUSTOMER NETWORK>
544 — FILTER RULES :   PROTOCOL 17 FROM ANY  ANY TO ANY <ROHC PORT RANGE>

DYNAMIC FLOWS TO BE INSTALLED ON RAR/RAA EXCHANGE (PROHC)

610 —
612 — TITLE: POLICY FOR VOIP SIGNALING

614 — PRECEDENCE :5
616 — TYPE: TY
618 — ROHC: MARK FLOWS FOR COMPRESSION USING NEW AVP
620 — DSCP POLICY: EF
622 — FLOW ID: NONE (SO USE SESSION-ID TO MATCH FLOW)
624 — TRAFFIC POLICING: <ASSIGN BANDWIDTH BASED ON SUBSCRIBER CLASS>
626 — FILTER RULES : PROTOCOL 17 FROM <SOURCE IP> ANY <DEST IP> ROHC RTCP PORT

630 —
632 — TITLE: POLICY FOR VOIP MEDIA
634 — PRECEDENCE :5
636 — TYPE: TY
638 — ROHC: MARK FLOWS FOR COMPRESSION USING NEW AVP
640 — DSCP POLICY: EF
642 — FLOW ID: NONE (SO USE SESSION-ID TO MATCH FLOW)
644 — TRAFFIC POLICING: <ASSIGN BANDWIDTH BASED ON SUBSCRIBER CLASS>
646 — FILTER RULES : PROTOCOL 17 FROM <SOURCE IP> ANY <DEST IP> ROHC RTP PORT

TIERED SUBSCRIBER SERVICE WITH ADVANCED HEADER COMPRESSION METHODS IN A VOIP SYSTEM

CROSS-REFERENCE TO RELATED APPLICATIONS

This application is a continuation of U.S. patent application Ser. No. 12/126,090, filed May 23, 2008, entitled "Tiered Subscriber Service With Advanced Header Compression Methods In A VOIP System."

SUMMARY

The present invention is defined by the claims below. Embodiments of the present invention provide a system and method for providing a dynamic tiered subscriber service in a mobile telephone network using a voice over IP "VOIP" system (e.g. 3/4G system). A dynamic, tiered-subscriber service allows the bandwidth allotted to users subscribing to different levels of service to be adjusted between communication sessions to accommodate changing network conditions. Embodiments of the present invention have several practical applications in the technical arts including allowing header compression and a dynamic tiered subscriber functionality to operate concurrently while providing VOIP wireless communications.

In a first illustrative aspect, one or more computer-readable media with computer-executable instructions embodied thereon that when executed performs a method of setting up a wireless telephone call utilizing VOIP technology with dynamically adjustable bandwidth allocation based on tiered subscriber service is provided. The method includes, during setup of the wireless telephone call including a mobile-communication device as at least one endpoint of the wireless telephone call, installing, on a gateway, a header compression policy governing a flow of voice packets between the mobile-communication device and a radio access network. The header compression policy including a first attribute-value pair that defines header compression parameters for the voice packets and a second attribute-value pair that instructs the gateway to allocate bandwidth for the wireless telephone call according to a subscriber service level associated with the mobile-communication device.

In another illustrative aspect, a communication system for enabling a wireless VOIP phone call that utilizes header compression of voice packets and allocates bandwidth for the phone call based on a subscriber service level associated with a mobile-communication device that is an endpoint for the phone call is provided. The system including a radio access network for transmitting data between the mobile-communication device and a gateway, wherein the radio access network is communicatively coupled to the gateway. The gateway establishes a data flow between the radio access network and another end point of the phone call. The system also includes a policy implementation component for pushing a header compression policy to the gateway that is communicatively coupled to the gateway, wherein the header compression policy instructs the gateway to compress a voice packet header, and allocate bandwidth to the phone call based on a subscriber class associated with the mobile-communication device.

In a final illustrative aspect, one or more computer-readable media with computer-executable instructions embodied thereon that when executed performs a method of setting up a wireless telephone call utilizing VOIP technology with dynamically adjustable bandwidth allocation based on tiered subscriber service is provided. The method includes establishing a main connection between a mobile-communication device and a gateway. The method also includes installing a static policy on the gateway that governs signaling during set up of the wireless telephone call. The method further includes establishing a signaling connection between the mobile-communication device and a call flow component that establishes a communication session. The method also includes installing a signaling policy on the gateway that provides a traffic-flow-template for VOIP signaling traffic. The method also includes establishing a media connection between the mobile-communication device and a different communication device participating in the wireless telephone call, wherein the media connection carries voice traffic as voice packets. The method further includes installing a bearer policy on the gateway that provides a traffic-flow-template for the voice traffic. The bearer policy specifies a bandwidth allocation based on a subscriber class associated with the mobile-communication device. The bearer policy also instructs the gateway to perform header compression on the voice packets. The system further includes installing a header compression policy on the gateway that assigns bandwidth based on the subscriber class associated with the mobile-communication device, and marks flow of the voice packets for header compression, thereby completing a setup of the wireless telephone call.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

3G Third Generation Communications System
4G Fourth-Generation Communications System
802.11 Wireless Local Area Network Standards
AAA Authentication, Authorization, and Accounting ASN Access Service Network
ASN-GW Access Service Network Gateway
CDMA Code Division Multiple Access
CD-ROM Compact Disc Read-Only Memory
CoS Class of Service
DVD Digital Versatile Disc
EEPROM Electrically Erasable Programmable Read-Only Memory
GPRS General Packet Radio Service
GSM Global System for Mobile Communications
HA Home Agent
IMS IP Multimedia Subsystem
IP Internet Protocol
PC Personal Computer
PDA Portable Digital Assistant
PDSN Packet Data Serving Node
QoS Quality of Service
RAM Random Access Memory
ROM Read-Only Memory
TDMA Time Division Multiple Access
VOIP Voice over Internet Protocol
WIMAX Worldwide Interoperability for Microwave Access Further, various technical terms are used throughout this description. A definition of such terms can be found in Newton's Telecom Dictionary by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-storage media include both volatile and non-volatile media, removable and non-removable media, and contemplates media readable by a database, a switch, and various other network devices. Network switches, routers, and related components are conventional in nature, as are means of communicating with the same. Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Embodiments of the present invention, allow phone calls involving a mobile telephone to be to be conducted using VOIP technology with header compression of the voice packets and dynamically adjustable tiered subscriber service. As described previously, a dynamic, tiered-subscriber service allows the bandwidth allotted to users subscribing to different levels of service to be adjusted between sessions to accommodate changing network conditions. This is in contrast to a static tiered subscriber service, which allocates a designated bandwidth based on subscriber tier without regard for network conditions (e.g. present bandwidth usage in the network). Header compression involves compressing the voice packet header to a reduced number of bites. For the purpose of this application, a voice packet is a data packet containing audio content of a telephone call. Generally, a voice packet includes a header that helps direct the transport of the voice packet and a payload that contains the audio content data. The header may include a RTP header, an UDP header, and an IP header all of which can be compressed into a reduced number of bits. Compressing the header can save significant amounts of bandwidth. In one embodiment, Robust Header Compression (ROHC) is used as the compression standard. Other header compression methods, such as IPHR and LLA-HR (Link-layer assisted header removal) may be used. Previously, it has not been possible to utilize header compression and dynamically tiered-subscriber service with VOIP technology.

Embodiments of the present invention enable simultaneous header compression and dynamic tiered-subscriber service through a new call flow set up that includes a new policy. The new policy is given preference over the other installed policies and includes new attribute value pairs that enables both header compression and dynamic bandwidth adjustments.

Exemplary Networking Environment

Figure 1:
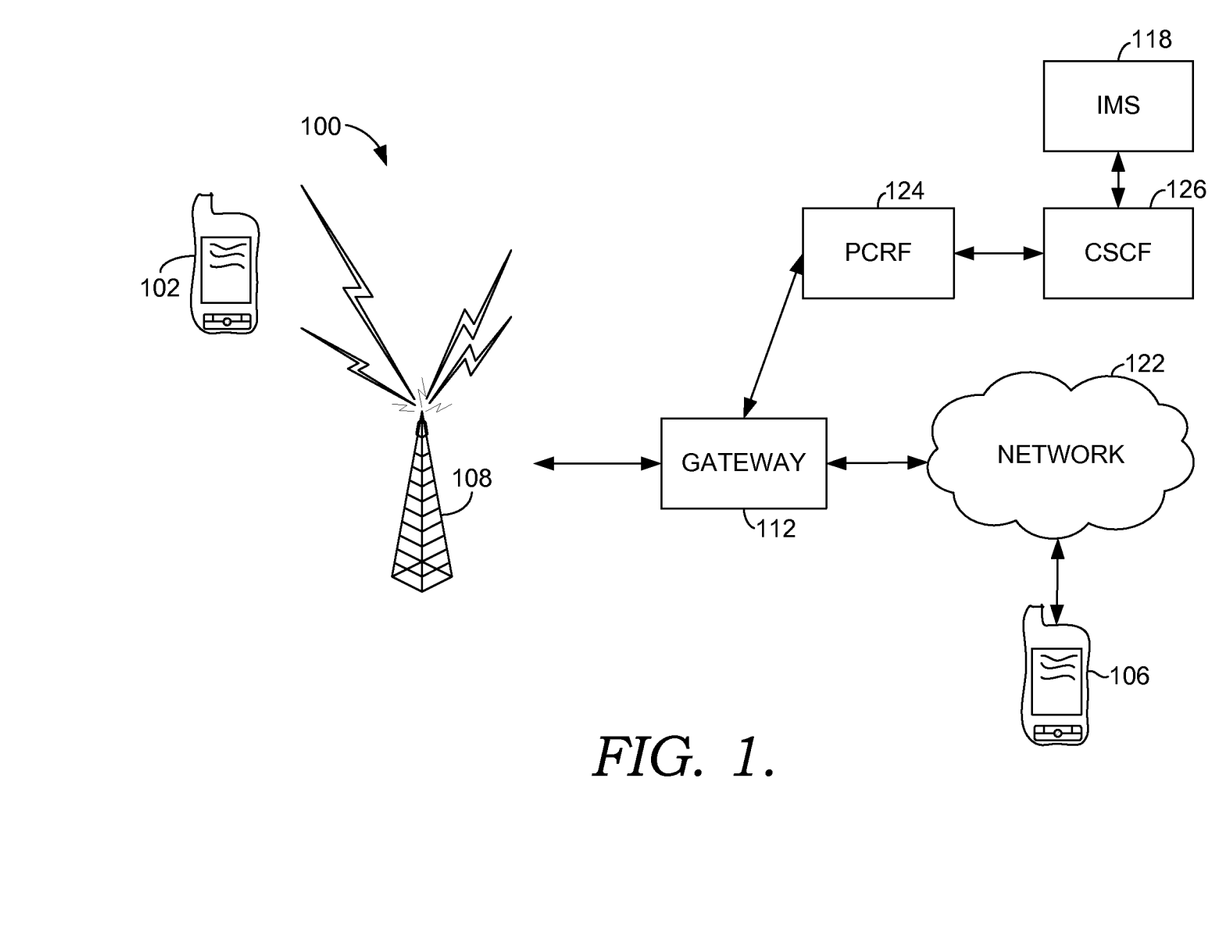
FIG. 1 depicts an illustrative wireless networking environment suitable for practicing an embodiment of the present invention.

Referring to the drawings generally, and initially to FIG. 1 in particular, an exemplary wireless-networking environment suitable for use in implementing embodiments of the present invention is illustrated and designated generally as reference numeral 100. Wireless-networking environment 100 is but one example of a suitable wireless-networking environment and is not intended to suggest any limitation as to the scope of use or functionality of the invention. Neither should wireless-networking environment 100 be interpreted as having any dependency or requirement relating to any one or combination of components illustrated. In particular, some terms used to describe components of wireless network 100 are commonly associated with networks utilizing CDMA Rev A protocols, but the invention is not meant to be limited to networks employing CDMA Rev A protocols. In the case where a CDMA Rev A specific term is used, it should be understood that embodiments of the present invention may work equally well utilizing functionally equivalent components in networks employing other protocols, such as, for instance, the next generations of global system for mobile communications ("GSM"), or the next generations of time division multiple access ("TDMA") protocols.

In wireless-networking environment 100, the mobile-communication device 102 is a wireless terminal that is adapted to receive communications over a wireless network. The mobile-communication device 102 may include a bus (not shown) that directly or indirectly couples the following devices: memory (not shown), one or more processors (not shown), one or more presentation components (not shown), input/output (I/O) ports (not shown), I/O components (not shown), and a power supply such as a battery. The mobile-communication device 102 may use next generation standard air interface protocols, such as code division multiple access Rev A, HSDPA, or WiMax as well as others, to communicate with the radio access network 108. Other network communication interface arrangements are also possible.

The wireless-communication device 102 may take any of a variety of forms. By way of example, the mobile-communication device 102 may be a mobile telephone, a computer, a personal digital assistant ("PDA") or any combination of these or other devices. The mobile-communication device 102 may be configured to receive and/or convey information such as voice and data (e.g., fax, e-mail and other text messages) and/or other media (e.g., audio, video and graphics). Further, the mobile-communication device 102 may include input and output facilities such as a touch-pad, a keyboard, a camera, a display, a microphone and/or a speaker. The mobile-communication device 102 may be equipped with web browsing software to allow subscribers to communicate with web servers over an Internet Protocol (IP) network (i.e., the Internet). The mobile-communication device 102 may be configured to receive, by way of example and not limitation, telephone calls, emails, text messages, pages, pictures, video, TV shows, radio, music, calendar reminders, and other files with communicative properties. For the sake of illustration, throughout this disclosure the mobile-communication device 102 is the device with which embodiments of the present invention are practiced.

Communications device 106 is capable of placing voice calls using the IMS 118 core, including Quality of Service (QoS) technologies. Communications device 106 could be a wireless or landline communications device.

The radio access network 108 communicates over a wireless air interface utilizing a wireless access network, such as 3G, 4G, CDMA, GPRS, GSM, TDMA, WIMAX, and the like. In one embodiment, the wireless access network might be a mobile wireless broadband access network. In embodiments, radio access network 108 provides gateway header data to packets such that packets received by radio access network 108 may be communicated to gateway 112. As used herein, a packet refers to a formatted block of data. A packet can include any data, such as, for example, text, numerals, symbols, characters, audio (e.g., voice), video, images, and the like. Only one radio access network is shown, and without its many components, for the sake of clarity.

The radio access network 108 communicates with an access gateway 112. Access gateway 112 provides a boundary between radio communication functions embodied in one or more radio access systems that form the access-facing portion of wireless-networking environment 100 and the standard internet protocol (IP) communication functions (including Mobile IP) embodied in the public-network facing portion (e.g., network 122) of wireless-networking environment 100. In one embodiment, access gateway 112 performs protocol conversion. That is, access gateway 112 may convert signals from a first protocol to a second protocol. Access gateway 112 might be, for example, an ASN-GW, a PDSN, a SGSN/GGSN, and the like. In embodiments, access gateway 112 can be coupled with a foreign agent (FA). In one embodiment, access gateway 112 provides home agent (HA) header data to packets such that packets received by access gateway 112 may be communicated to a HA. Packets might be tunneled to and from an HA over unencrypted IP-in-IP tunneling.

Wireless-networking environment 100 includes a communication network 122. The communication network 122 may include one or more mobile networks, one or more packet based networks, including the Internet, and the public switched telephone network (PSTN). The various components within the communication network 122 may be owned, and/or operated by, multiple entities, commercial or otherwise. The communication network 122 is configured to transmit a variety of communication formats. The communication network 122 is adapted to carry these communication formats between a variety of communication devices including, phones, computers, mobile phones, PDA's, pagers, server computers, client computers, and fax machines. The lists of communication devices and communication formats is not exhaustive and other devices and communication formats could be compatible with, or carried on, the communication network 122 and be compatible with embodiments of the present invention.

As stated, the communication network 122 may include one or more wireless networks that may be operated by one or more wireless service providers. The wireless network allows mobile-communication device 102 to communicate with other mobile-communication devices and with other communication devices connected to the communication network 122, such as communication device 106.

Policy changing resource function (PCRF) 124 is a device that is used to authorize various bandwidth allocations for flows to a mobile device, such as mobile-communication device 102. A flow is a communication link established by a mobile device for transmitting and receiving data packets between the same two endpoints. In an embodiment, the flow can include common characteristics such as a destination IP address, a port range, and a type of protocol being used (User Datagram Protocol (UDP) or Transmission Control Protocol (TCP) for example). Some examples of different types of flows are a signaling flow, a bearer flow, and a best effort flow. In an embodiment, the PCRF 124 is utilized to pre-authorize a flow before data traffic is transmitted on the flow. PCRF 124 may also be used to upgrade or downgrade a flow that has been authorized. In an embodiment, upgrading a flow can include increasing the bandwidth allocation of the flow, while downgrading a flow can include decreasing the bandwidth allocation of the flow or terminating the flow.

Call service control function (CSCF) 126 is a device that is configured to receive session initiation protocol (SIP) signals from a mobile device that relate to a mobile device establishing or terminating a communication session with one or more other devices. In an embodiment, the CSCF 126 is part of an IP multimedia subsystem (IMS) 118. The CSCF receives a SIP invite message from the mobile device to establish a communication session. The CSCF 126 then generates an authorization request message (AAR) to send to the PCRF 124 so the PCRF 124 can authorize the flow.

Figure 2:
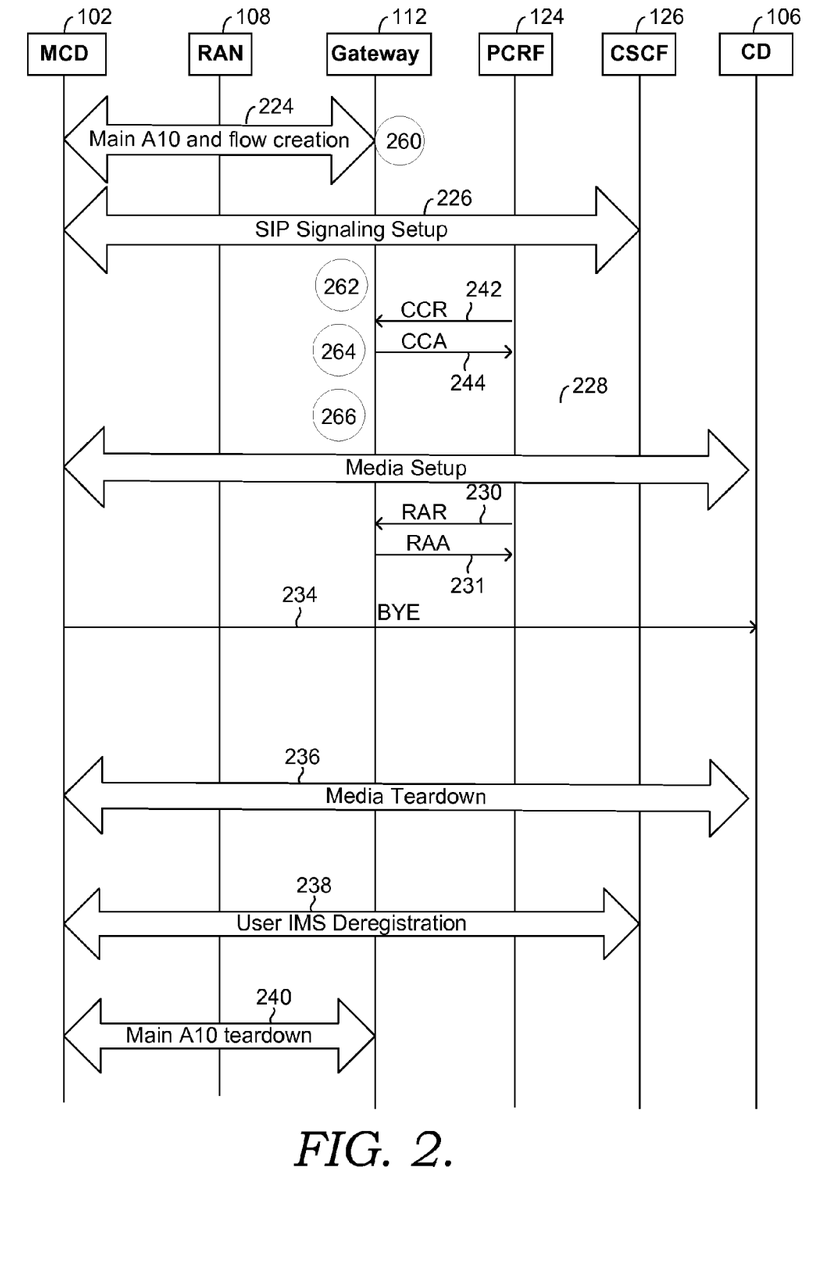
FIG. 2 depicts a call flow setup in accordance with an embodiment of the present invention.

FIG. 2 is a ping-pong diagram of an exemplary method 200 of call flow creation used to create a flow that allows both header compression and dynamically adjusted levels of service, according to an embodiment of the invention. FIG. 2 shows communications that occur between components to set up a wireless telephone call between mobile-communication device 102 and communication device 106 that uses Voice over Internet Protocol (VOIP). The intermediary components include radio access network 108, gateway 112, PCRF 124, CSCF 126, and communication device 106. These components have been described previously with reference to FIG. 1.

The primary purpose of FIG. 2 is to illustrate the sequence in which policies 260, 262, 264, 266 are installed on the gateway 112 during a call set up, in accordance with an embodiment of the present invention. The actual policies will be described in detail with reference to FIGS. 3-6. Initially, the main A10 connection 224 is established between the mobile-communications device 102 and the gateway 112 using best effort traffic. The static policy 260 may be installed on the gateway 112 at this time. In one embodiment, the static policy 260 is present on the gateway 112 at the time the A10 connection 224 is established. The gateway 112 chooses the static policy to install based on the type of A10 connection 224 that is established.

Next, the SIP signaling connection 226 is established between the wireless-communication device 102 and the CSCF 126. The SIP signaling connection 226 carries the call set up traffic. At this time, the signaling traffic-flow-template policy 262 is installed on the gateway. In one embodiment, the signaling traffic-flow-template policy 262 is pushed from the PCRF 124 to the gateway 112 as part of the credit control request (CCR) message 242. In response to the CCR message 242, the gateway 112 may transmit a credit control answer (CCA) message 244 to the PCRF 124.

Next, the media connection 228 between the mobile-communication device 102 and the communication device 106 is established. The media connection carries the voice traffic once the call is set up. In conjunction with the media connection, the bearer traffic-flow-template policy 264 is installed. In one embodiment, the bearer traffic-flow-template policy 264 is pushed from the PCRF 124 to the gateway 112 as part of the CCR message. Finally, the header compression policy 266 is installed. In one embodiment, the header compression policy is pushed from the PCRF 124 to the gateway 112 as part of the re-authorization request (RAR) message 230. In response to the RAR message, the gateway sends a re-authorization answer RAA message to the PCRF 124.

After the bye message 234, the various connections are torn down in reverse order and the policies are uninstalled. First, the header compression policy 266 is uninstalled. Next, the media connection is torn down 236 and the bearer traffic-flow-template policy 264 is uninstalled. Next, user IMS deregistration occurs and the signaling traffic-flow-template policy 262 is uninstalled. Finally, the A10 connection is torn down 240 and the static policy 260 is uninstalled. At this point, the communication session used to complete the call is over.

Turing now to FIGS. 3-6, characteristics of polices 260, 262, 264, and 266 are shown, in accordance with embodiments of the present invention. The policy attributes shown on the policies are not meant to be comprehensive. Depending on the implementation details, other policies attributes may be included in the policy. The policy descriptions in FIGS. 3-6 use language consistent with the Rev A standard and the Diameter communications protocol. It is important to note that embodiments of the present invention could be implemented within other standards and protocols and is not intended to be limited to the Rev A standard and the Diameter communications protocol. The gateway 112 handles data packets associated with the call based on the content of policies described in FIGS. 3-6.

Figure 3:
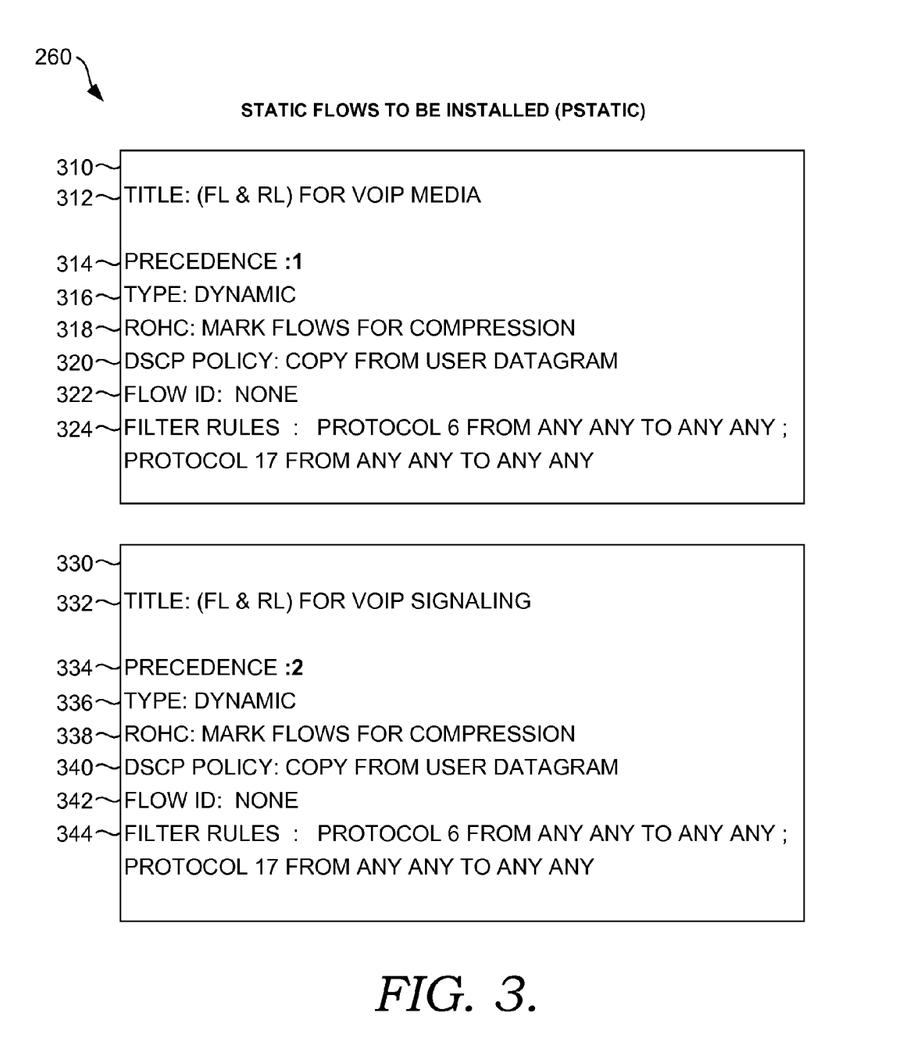
FIGS. 3-6 depict illustrative call policies loaded on a gateway during the call set up, in accordance with embodiments of the present invention.

FIG. 3 shows characteristics of static policy 260. Static policy 260 governs the signaling flow during the call set-up. As described previously, the static policy may be installed on the gateway 112 at the time the initial A10 connection 224 is set up. Static policy 260 consists of two sub-policies; VOIP media policy 310 and VOIP signaling policy 330. The VOIP media policy 310 includes instructions for VOIP media flows in the forward and reverse directions. The title 312 is (FL & RL) for VOIP media. Precedence 314 is equal to one. The gateway 112 uses the precedence associated with various policies to determine which installed policy to follow. As will be seen, all of the other installed policies have a precedence value higher than 1, thus the static policy 260 will not be preferred by the gateway 112 after the other polices are installed.

The ROHC attribute 318 is set to mark flows for compression. This setting instructs the gateway to mark voice packet headers for compression. ROHC refers to robust header compression and is one form of compression that may be used with embodiments of the present invention. ROHC is particularly well suited for header compression of packets transferred over a wireless network. As stated previously, other header compression methods could be used.

The Differentiated Services Code Point (DSCP) policy 320 is set to copy from user datagram. The user datagram contains information about a user associated with a mobile-communication device. The DSCP policy is used by the gateway to classify packets and determine the preference given to data packets associated with the policy. The flow ID 322 is set at none. At this point in the call set up, the media flow has not yet been set up so a flow ID is not available. The filter rules 324 represent default filter rules that are very general.

VOIP signaling policy 330 governs the flow of VOIP signaling to and from the gateway 112. The title 332 is (FL & RL) for VOIP signaling. The type attribute 336, the ROHC attribute 338, the DSCP policy attribute 340, the flow ID attribute 342, and the filter rules 344 are identical to those described with reference to the VOIP media policy 310. The precedence attribute 344 is set to two. As described previously, the policy associated with the highest precedence will be selected by the gateway 112 to govern the associated data flow. In this case, it is not important that the precedence is set specifically to two but that the precedence is greater than the precedence associated with the VOIP media policy 310 and less than the precedence associated with the other polices that are yet to be described.

Figure 4:
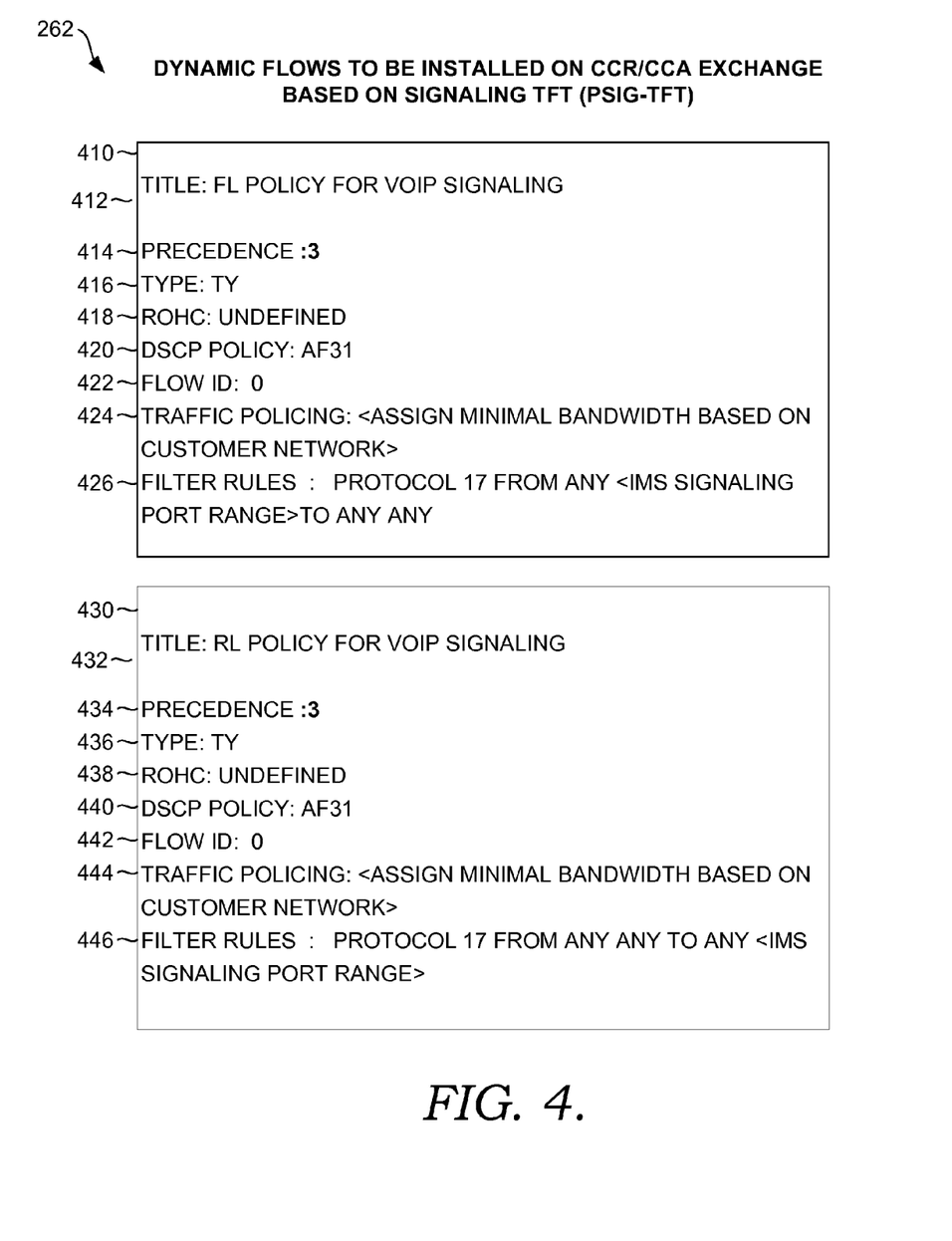

Turning now to FIG. 4, the signaling traffic-flow-template policy 262 is described in accordance with an embodiments of the present invention. The signaling traffic-flow-template policy 262 includes a forward policy 410 and a reverse policy 430. The forward policy 410 governs signaling flow from the gateway 112 to the mobile-communication device 102. The reverse policy 430 governs flow of data from the mobile-communication device 102 to the gateway 112. The signaling traffic-flow-template policy 262 may govern the signaling flow during the telephone call.

Forward policy 410 is titled 412 "FL policy for VOIP signaling". The precedence 414 is set to three. As described previously, setting the precedence to three indicates that the forward signaling policy 410 is preferred over policies with a lower precedence. The specific precedence value of three is not important, other than for the fact it is higher than the precedence values associated with previously described policies. The type attribute 416 is set at "TY." TY is the interface between the gateway 112 and the PCRF 124. Other types of interfaces may be specified depending on the access network. The ROHC 418 is undefined. The DSCP policy 420 is set to "AF31." AF stands for assured forwarding. The assured forwarding guarantees a certain amount of bandwidth and allows access to more bandwidth if it is available. As described previously, the DSCP policy governs the priority given to data flows associated with the present policy. Flow ID 422 is set at zero. The flow ID 422 identifies data packets belonging to a specific flow by adding the flow ID to the data packet. Zero is an exemplary flow ID value and any value associated with a particular flow could be included. The policy would then govern flows with the associated flow ID. Traffic policing 424 is set to "assign minimal bandwidth based on customer network." The traffic policing setup allows the network to allocate bandwidth for signaling based on network usage. The filter rule 426 is again a standard protocol. If an actual phone call were being setup, the "IMS signaling port range" would include the numbers of actual ports.

Reverse policy 430 is titled RL Policy for VOIP signaling. The precedence attribute 434, the type attribute 436, the ROHC attribute 438, the DSCP policy attribute 440, the flow ID 442, and the traffic policing 444 contain the same attribute values as described above with reference to the forward policy for VOIP signaling 410. Filter rule 446 is essentially the same as filter rule 426 except that it specifies an IMS signaling port range that includes the destination ports.

Figure 5:
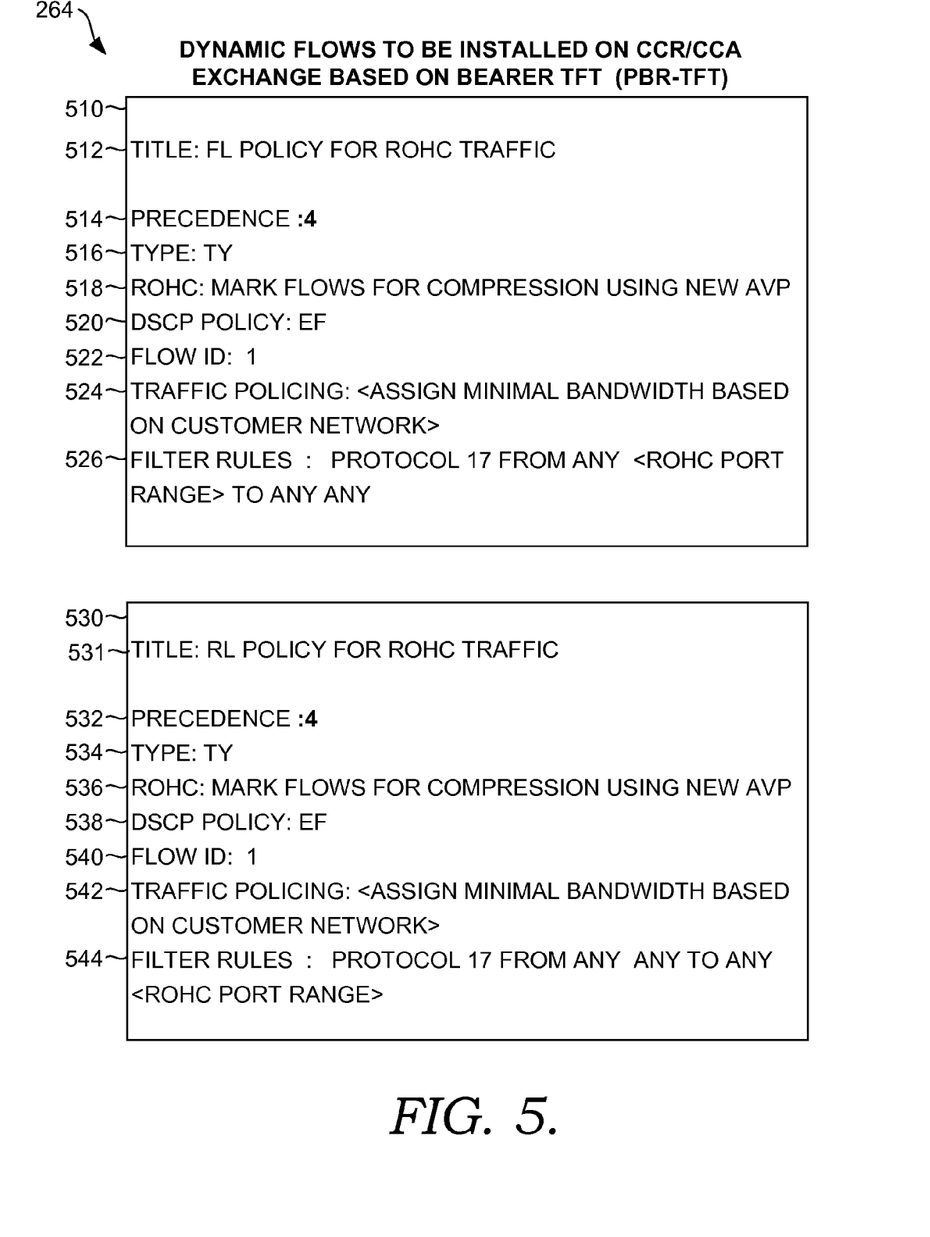

Turning now to FIG. 5, the bearer traffic-flow-template policy 264 is described in accordance with embodiments of the present invention. The bearer traffic-flow-template policy 264 includes a forward policy 510 and the reverse policy 530. The forward policy 510 governs the flow of voice packets from the gateway 112 to the mobile-communication device 102. The precedence attribute 514 is four. This gives forward policy 510 precedence over the previously described policies. As described previously, the policy with the highest precedence level will be implemented by the gateway 112 to govern the associated data flow. The type attribute 516 is set at TY. The ROHC attribute 518 is set as mark flows for compression using new AVP (attribute value pair). Two new attribute value pairs are used to mark the flows for compression. The first AVP enables or disables header compression. The second AVP describes the mode of header compression to be used in compressing the header associated with voice packets. Various methods of compressing a voice packet header are known in the art and may be designated as the compression mode.

The DSCP policy 520 is set at EF ("express forwarding"). The EF policy has a higher priority than the AF31 designated by previously described policy. This means that data packets associated with forward policy 510 would be given priority over other data packets associated with a DSCP set to AF31. The flow ID 522 is set to one. The traffic policing 524 is set to "assign minimal bandwidth based on customer network." The filter rule 526 is a generic filter rule that designates a range of ports that can be used by the ROHC compressed bearer traffic.

The reverse policy 530 has a title 531 of RP policy for ROHC traffic. The reverse policy governs the media flow received by the gateway 112. The reverse policy 530 includes a precedence 532 of four, the type 534 is "TY," the ROHC is set to marking flows for compression using the AVPs previously described, a DSCP policy 538 is set to EF and a flow ID 540 is set to one. The traffic policing 542 is also set to "assign minimal bandwidth based on customer network." The filter rule 544 is the same as filter rule 526 except that it designates port ranges to which data packets are sent rather than ports from which data packets leave the gateway 112.

Figure 6:
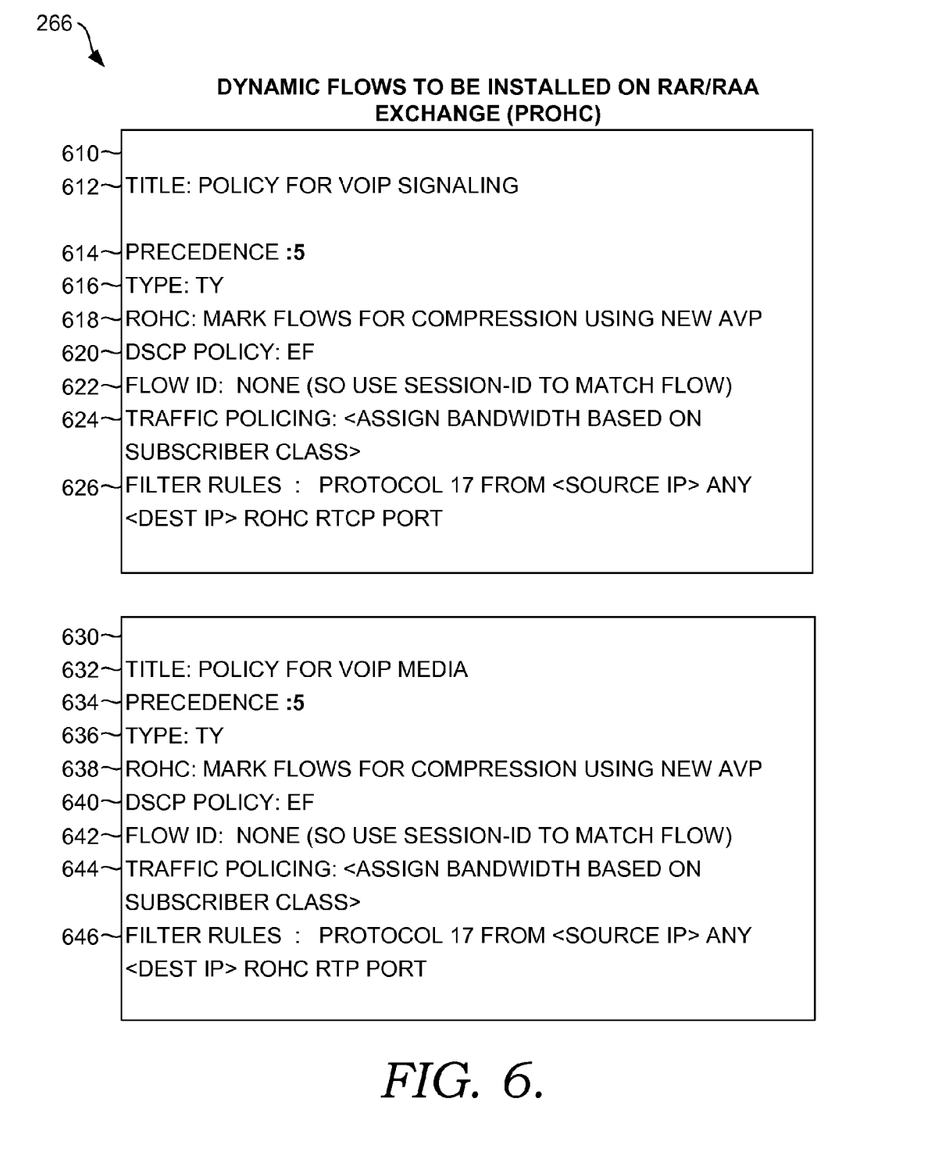

Turning now to FIG. 6, the header compression policy 266 is described in accordance with an embodiment of the present invention. The header compression policy 266 includes a VOIP signaling policy 610 and a VOIP media policy 630. The VOIP signaling policy governs signaling flow while the phone call is active. The VOIP media policy 630 governs the voice packets.

The title of VOIP signaling policy 610 is policy for VOIP signaling. The precedence attribute 614 is set to 5. The precedence of five ensures that this policy will be given precedence over all other policies previously described. Thus, policy 610 will be the policy governing signaling once the call is fully set up. The type 616 is set to TY. The ROHC 618 is set to mark flows for compression using the new AVPs. The new AVPs have been described previously to include an AVP that activates the compression and an AVP that designates the mode of header compression. The DSCP policy 620 is set to EF. The flow ID 622 is set to none. In this case, the session ID (not shown) would be used to match the flow with the policy.

The traffic policing 624 is set to assign bandwidth based on subscriber class. This attribute allows the policy to accommodate a tiered subscriber class. For example, a gold member could be given more bandwidth than a silver member. The filter rules 626 specifies a particular source IP address and a destination IP address that represent the end points of the telephone conversation. One of the end points would be the mobile-communication device 102. The filter rule will also designate a specific ROHC RTCP (Real-time Transport Control Protocol) port by number. The ROHC rtcp port that is designated would be one of the ports within the range designated in filter rule 526 in policy 510.

The VOIP media policy 630 has a title attribute 632 of Policy for VOIP Media. The precedence value 634 is five. This indicates that the VOIP media policy 630 will govern flow of VOIP media associated with the policy. The type 636 is set to TY. The ROHC attribute 638 is set to mark flows for compression using the new AVPs, which have been described previously. The DSCP policy 640 is set to EF. The flow ID 642 is set to none for reasons described previously with reference to VOIP signaling policy 610. The traffic policing 644 is set to assign bandwidth based on subscriber class as described previously. The filter rule 646 is the same as the one described previously with reference to filter rule 626.

Figure 7:
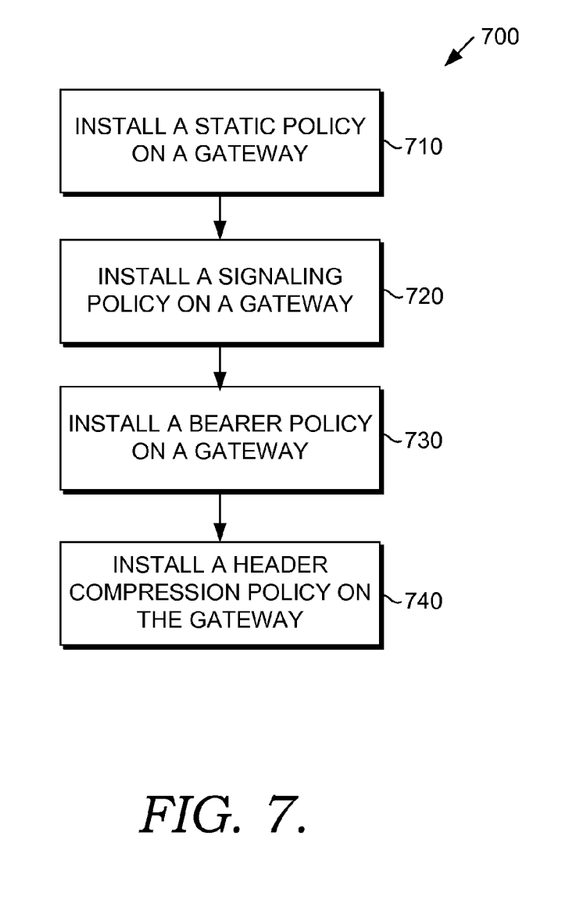
FIG. 7 is a flow chart that depicts a method of setting up a wireless telephone call utilizing VOIP technology with dynamically adjustable bandwidth allocation based on tiered subscriber service, in accordance with an embodiment of the present invention.

Turning now to FIG. 7, a method of setting up a wireless telephone call utilizing VOIP technology with dynamically adjustable bandwidth allocation based on tiered subscriber service is shown, in accordance with an embodiment of the present invention. At step 710, a static policy is installed on a gateway. As described previously, the static policy may be installed in conjunction with setting up the main connection between a mobile communication device and a gateway.

At step 720, a signaling policy is installed on the gateway. The signaling policy may be pushed to the gateway from a PCRF. A signaling policy contains instructions for handling signaling traffic during the wireless telephone call. The gateway will follow the instructions on the signaling policy as long as the signaling policy is installed on the gateway and has a higher precedence than other policies governing signaling. At step 730, a bearer policy is installed on the gateway. The bearer policy includes instructions on how to handle voice packets as part of the wireless telephone call. The bearer policy may be installed after a media connection or in conjunction with a media connection being made. At step 740, a header compression policy is installed on the gateway. The header compression policy may include a first attribute value pair that defines header compression parameters for the voice packets governed by the header compression policy. A second attribute value pair may instruct the gateway to allocate bandwidth for the wireless telephone call according to a subscriber service level associated with the mobile communication device participating in the wireless telephone call. This combination of attributes allows a wireless telephone call using VOIP technology to be set up such that header compression is possible along with the dynamic allocation of bandwidth based on subscriber class. In one embodiment, the header compression parameters include the specification of a header compression mode. The header compression parameters may also include an activation status that may activate or deactivate header compression. In one embodiment, each policy is associated with a precedence. The header compression policy may have the highest precedence, the bearer policy the second highest precedence, the signaling policy the third highest precedence, and the static policy the lowest precedence. Policies with a higher precedence will be preferred by the gateway in determining how to handle associated media and signaling data.

Once a call has been terminated, the header compression policy may be uninstalled first. Subsequently, the media connection may be terminated. After the media connection has been terminated, the bearer policy may be uninstalled. After the bearer policy is uninstalled the signaling connection may be terminated. After the signaling connection is terminated, the signaling policy may be uninstalled. Finally, the main connection is terminated and the static policy may be uninstalled.

Figure 8:
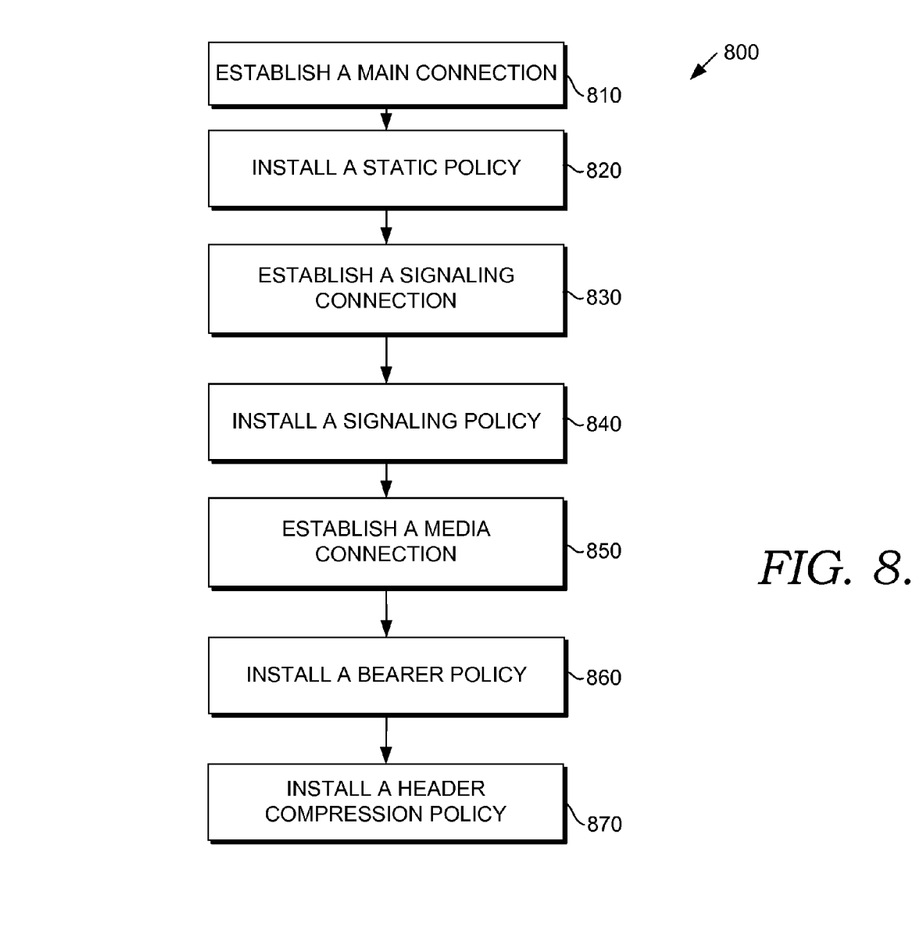
FIG. 8 is a flow diagram that depicts a method of setting up a wireless telephone call utilizing VOIP technology with dynamically adjustable bandwidth allocation based on tiered subscriber service, in accordance with embodiments of the present invention.

Turning now to FIG. 8, a method of setting up a wireless telephone call utilizing VOIP technology with dynamically adjustable bandwidth allocation based on tiered subscriber service is shown and designated generally with numeral 800. At step 810, a main connection between a mobile communication device and a gateway is established. At step 820, a static policy is installed on the gateway that governs the signaling during setup of the wireless telephone call. At step 830, a signaling connection between the mobile communication device and a call flow component that establishes a communication session is established. In one embodiment, the call flow component is a CSCF. At step 840, a signaling policy is installed on the gateway to provide a traffic flow template for VOIP signaling traffic. At step 850, a media connection between the mobile communication device and a different communication device participating in the wireless telephone call is established. The media connection carries voice traffic as voice packets.

At step 860, a bearer policy is installed on the gateway to provide a traffic-flow-template for the voice traffic. The bearer policy specifies a bandwidth allocation based on a subscriber class associated with the mobile communication device. The bearer policy may also instruct the gateway to perform header compression on the voice packets. At step 870, a header compression policy is installed on the gateway. The function of the header compression policy has been described previously. As described previously, once the telephone call is terminated the policies and connections may be terminated or uninstalled in the reverse order.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described

The invention claimed is:

1. One or more non-transitory computer-readable media with computer-executable instructions embodied thereon that when executed performs a method of setting up a wireless telephone call utilizing VOIP technology with dynamically adjustable bandwidth allocation based on tiered subscriber service, the method comprising:
   during setup of the wireless telephone call including a mobile-communication device as at least one endpoint of the wireless telephone call, installing, on a gateway, a header compression policy governing a flow of voice packets between the mobile-communication device and a radio access network, the header compression policy including:
      (1) a first attribute-value pair that defines header compression parameters for the voice packets, and
      (2) a second attribute-value pair that instructs the gateway to allocate bandwidth for the wireless telephone call according to a subscriber service level associated with the mobile-communication device;
   installing a static policy on the gateway;
   installing a signaling policy on the gateway; and
   installing a bearer policy on the gateway, wherein the header compression policy is installed after the bearer policy, the signaling policy, and the static policy are installed on the gateway, wherein the header compression policy is installed after a media flow is set up, wherein the bearer policy and the signaling policy are installed in conjunction with a signaling flow setup, and wherein the static policy is installed in conjunction with a main connection set up.

2. The non-transitory media of claim 1, wherein the header compression parameters include a header compression mode.

3. The non-transitory media of claim 2, wherein the header compression parameters include an activation status of a header compression function.

4. The non-transitory media of claim 1, wherein the header compression policy further includes:
   a precedence value that causes the header compression policy to be given precedence over all other policies installed on the gateway; and
   a filter rule that designates a port in the gateway to transmit the voice packets with compressed headers.

5. The non-transitory media of claim 1, wherein the header compression technology is one or more of robust header compression, IPHR, and LLA-HR.

6. The non-transitory media of claim 1, wherein the method further comprises:
   after the wireless telephone call is terminated, uninstalling the header compression policy from the gateway;
   after the header compression policy is uninstalled, uninstalling the bearer policy from the gateway;
   after the bearer policy is uninstalled, uninstalling the signaling policy from the gateway; and
   after the signaling policy is uninstalled, uninstalling the static policy from the gateway.

7. The non-transitory media of claim 6, wherein the bearer policy governs transmission of the voice packets and includes the first attribute value pair and the second attribute value pair.

8. The non-transitory media of claim 7, wherein the signaling policy governs signaling traffic associated with the wireless telephone call.

9. A communication system for enabling a wireless VOIP phone call that utilizes header compression of voice packets and allocates bandwidth for the phone call based on a subscriber service level associated with a mobile-communication device that is an endpoint for the phone call, the system comprising:
   a radio access network for transmitting data between the mobile-communication device and a gateway, wherein the radio access network is communicatively coupled to the gateway;
   the gateway for establishing a data flow between the radio access network and another end point of the phone call;
   a policy implementation component for pushing a header compression policy to the gateway that is communicatively coupled to the gateway, wherein the header compression policy instructs the gateway to
      (1) compress a voice packet header, and
      (2) allocate bandwidth to the phone call based on a subscriber class associated with the mobile-communication device, and
   for transmitting a bearer policy to the gateway, wherein the bearer policy instructs the gateway to:

(1) compress the voice packet header, and
(2) to allocate bandwidth to the phone call based on the subscriber class associated with the mobile-communication device, and wherein the bearer policy specifies a range of ports on the gateway, and wherein the bearer policy has a lower precedence that the header compression policy.

10. The system of claim 9, wherein the header compression policy has a preference level that is greater than preference levels associated with other policies installed on the gateway that are related to the phone call, and wherein the preference level is used by the gateway to determine which policy governs the phone call.

11. The system of claim 9, wherein the header compression policy specifies a mode of compression to be used by the gateway.

12. The system of claim 9, wherein the header compression policy includes a filter rule that specifies a port on the gateway to be used to compress the voice packet header.

13. One or more non-transitory computer-readable media with computer-executable instructions embodied thereon that when executed performs a method of setting up a wireless telephone call utilizing VOIP technology with dynamically adjustable bandwidth allocation based on tiered subscriber service, the method comprising:

establishing a media connection between a mobile-communication device and a different communication device participating in the wireless telephone call, wherein the media connection carries voice traffic as voice packets;

installing a bearer policy on the gateway that provides a traffic-flow-template for the voice traffic, wherein the bearer policy specifies a bandwidth allocation based on a subscriber class associated with the mobile-communication device, and wherein the bearer policy instructs the gateway to perform header compression on the voice packets;

installing a header compression policy on the gateway that assigns bandwidth based on the subscriber class associated with the mobile-communication device, and marks flow of the voice packets for header compression, thereby completing a setup of the wireless telephone call, and dynamically adjusting bandwidth allocation of the voice packets from the gateway to the mobile-communication device based on the installed bearer policy.

14. The non-transitory media of claim 13, and wherein the bearer policy specifies a range of ports on the gateway.

15. The non-transitory media of claim 13, wherein the bearer policy has a lower precedence that the header compression policy.

16. The non-transitory media of claim 13, wherein the header compression policy has a preference level that is greater than preference levels associated with other policies installed on the gateway that are related to the phone call, and wherein the preference level is used by the gateway to determine which policy governs the phone call.

17. The non-transitory media of claim 16, wherein the preference level is used by the gateway to determine which policy governs the phone call.

18. The non-transitory media of claim 13, wherein the header compression technology is one or more of robust header compression, IPHR, and LLA-HR.

\* \* \* \* \*